(12) United States Patent
Chamarti et al.

(10) Patent No.: US 7,855,697 B2
(45) Date of Patent: Dec. 21, 2010

(54) ANTENNA SYSTEMS FOR PASSIVE RFID TAGS

(75) Inventors: Aravind Chamarti, Painted Post, NY (US); John David Downie, Painted Post, NY (US); Bradley Richard Thurow, Fargo, ND (US); James Scott Sutherland, Corning, NY (US); Richard Edward Wagner, Painted Post, NY (US); Matthew Scott Whiting, Lawrenceville, PA (US)

(73) Assignee: Corning Cable Systems, LLC, Hickory, NC (US)

( * ) Notice: Subject to any disclaimer, the term of this patent is extended or adjusted under 35 U.S.C. 154(b) by 0 days.

(21) Appl. No.: 11/891,830

(22) Filed: Aug. 13, 2007

(65) Prior Publication Data

US 2009/0045961 A1 Feb. 19, 2009

(51) Int. Cl.
*H01Q 1/38* (2006.01)
*H01Q 13/10* (2006.01)
*H01Q 1/36* (2006.01)

(52) U.S. Cl. .............................. 343/895; 343/700 MS; 343/767; 343/770

(58) Field of Classification Search ................ 343/895, 343/700 MS, 767, 770
See application file for complete search history.

(56) References Cited

U.S. PATENT DOCUMENTS

| 4,889,977 | A | 12/1989 | Haydon |
| 5,483,467 | A | 1/1996 | Krupka et al. |
| 5,528,222 | A | 6/1996 | Moskowitz et al. |
| 5,821,510 | A | 10/1998 | Cohen et al. |
| 5,910,776 | A | 6/1999 | Black |
| 5,914,862 | A | 6/1999 | Ferguson et al. |
| 5,995,006 | A | 11/1999 | Walsh |
| 6,002,331 | A | 12/1999 | Laor ........................ 350/539 |
| 6,025,725 | A | 2/2000 | Gershenfeld et al. |
| 6,100,804 | A | 8/2000 | Brady et al. |
| 6,118,379 | A | 9/2000 | Kodukula et al. |
| 6,127,929 | A | 10/2000 | Roz |
| 6,133,835 | A | 10/2000 | De Leeuw et al. |
| 6,164,551 | A | 12/2000 | Altwasser |
| 6,232,870 | B1 | 5/2001 | Garber et al. |
| 6,320,509 | B1 * | 11/2001 | Brady et al. ............. 340/572.7 |

(Continued)

FOREIGN PATENT DOCUMENTS

DE  19841738  3/2000

(Continued)

*Primary Examiner*—Rexford N Barnie
*Assistant Examiner*—Thienvu V Tran
(74) *Attorney, Agent, or Firm*—Kwadjo Adusei-Poku

(57) ABSTRACT

Antenna systems for passive radio-frequency identification (RFID) tags. The antenna systems have a very small form factor with good power harvesting and good performance in proximity to other antennas. The antenna system includes at least one, and preferably two, parallel serpentine antenna elements formed on, or otherwise supported by, an antenna substrate so that a RFID-tag integrated circuit (IC) can be electrically contacted to the antenna system at one end of the antenna substrate. A conducting wire that runs in the same direction as the at least one serpentine antenna element is used to match impedance and enhance antenna performance and power flow between the antenna and the IC. An impedance-matching circuit may be employed in place of the conducting wire to facilitate impedance matching between the antenna and the IC.

28 Claims, 6 Drawing Sheets

U.S. PATENT DOCUMENTS

| | | |
|---|---|---|
| 6,424,263 B1 | 7/2002 | Lee et al. |
| 6,424,315 B1 | 7/2002 | Glenn et al. |
| 6,496,113 B2 | 12/2002 | Lee et al. |
| 6,496,382 B1 | 12/2002 | Ferguson et al. |
| 6,522,308 B1 | 2/2003 | Mathieu |
| 6,618,022 B2 | 9/2003 | Harvey |
| 6,693,513 B2 | 2/2004 | Tuttle |
| 6,784,802 B1 | 8/2004 | Stanescu |
| 6,808,116 B1 | 10/2004 | Eslambolchi et al. |
| 6,829,427 B1 | 12/2004 | Becker |
| 6,847,856 B1 | 1/2005 | Bohannon |
| 6,857,897 B2 | 2/2005 | Conn |
| 6,898,368 B2 | 5/2005 | Colombo et al. |
| 6,915,050 B2 | 7/2005 | Koyasu et al. |
| 6,924,997 B2 | 8/2005 | Chen et al. |
| 6,968,994 B1 | 11/2005 | Ashwood Smith |
| 6,971,895 B2 | 12/2005 | Sago et al. |
| 6,973,243 B2 | 12/2005 | Koyasu et al. |
| 6,999,028 B2 | 2/2006 | Egbert ..................... 343/700 |
| 7,014,100 B2 | 3/2006 | Zierolf |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,102,520 B2 | 9/2006 | Liu et al. |
| 7,151,455 B2 | 12/2006 | Lindsay et al. |
| 7,158,031 B2 | 1/2007 | Tuttle |
| 7,158,033 B2 | 1/2007 | Forster ..................... 340/572.1 |
| 7,165,728 B2 | 1/2007 | Durrant et al. |
| 7,170,393 B2 | 1/2007 | Martin |
| 7,194,180 B2 | 3/2007 | Becker |
| 7,205,898 B2 | 4/2007 | Dixon et al. |
| 7,210,858 B2 | 5/2007 | Sago et al |
| 7,221,277 B2 | 5/2007 | Caron et al. |
| 7,224,278 B2 | 5/2007 | Phaneuf et al. |
| 7,224,280 B2 | 5/2007 | Ferguson et al. |
| 7,233,250 B2 | 6/2007 | Forster |
| 7,243,837 B2 | 7/2007 | Durrant et al. |
| 7,253,735 B2 | 8/2007 | Gengel et al. |
| 7,265,674 B2 | 9/2007 | Tuttle |
| 7,275,970 B2 | 10/2007 | Hoshina |
| 7,297,028 B2 | 11/2007 | Daikuhara et al. |
| 7,298,266 B2 | 11/2007 | Forster |
| 7,298,330 B2 | 11/2007 | Forster |
| 7,306,489 B2 | 12/2007 | Werthman et al. |
| 7,336,243 B2 * | 2/2008 | Jo et al. ..................... 343/895 |
| 7,336,883 B2 | 2/2008 | Scholtz |
| 7,349,605 B2 | 3/2008 | Noonan et al. |
| 7,352,285 B2 | 4/2008 | Sakama et al. |
| 7,352,289 B1 | 4/2008 | Harris |
| 7,356,208 B2 | 4/2008 | Becker |
| 2002/0092347 A1 | 7/2002 | Niekerk et al. |
| 2003/0021580 A1 | 1/2003 | Matthews |
| 2003/0061393 A1 | 3/2003 | Steegmans et al. |
| 2004/0041714 A1 | 3/2004 | Forster |
| 2004/0114879 A1 | 6/2004 | Hiereth et al. |
| 2004/0117515 A1 | 6/2004 | Sago et al. |
| 2004/0149736 A1 | 8/2004 | Clothier |
| 2004/0253874 A1 | 12/2004 | Plishner |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. ............. 340/10.1 |
| 2005/0215119 A1 | 9/2005 | Kaneko |
| 2005/0224585 A1 | 10/2005 | Durrant et al. |
| 2005/0232636 A1 | 10/2005 | Durrant et al. |
| 2005/0259930 A1 | 11/2005 | Elkins, II et al. |
| 2006/0044148 A1 | 3/2006 | Daniels et al. |
| 2006/0148279 A1 | 7/2006 | German et al. |
| 2006/0166546 A1 | 7/2006 | Ashizawa et al. |
| 2006/0232419 A1 | 10/2006 | Tomioka et al. .......... 340/572.7 |
| 2006/0233506 A1 | 10/2006 | Noonan et al. |
| 2006/0267778 A1 | 11/2006 | Gengel et al. |
| 2007/0023525 A1 | 2/2007 | Son et al. ..................... 235/454 |
| 2007/0120684 A1 | 5/2007 | Utaka et al. |
| 2007/0152828 A1 | 7/2007 | Mohalik |
| 2007/0205897 A1 | 9/2007 | Forster |
| 2007/0216534 A1 | 9/2007 | Ferguson et al. |
| 2007/0236355 A1 | 10/2007 | Flaster et al. |
| 2007/0247284 A1 | 10/2007 | Martin et al. |

FOREIGN PATENT DOCUMENTS

| | | |
|---|---|---|
| DE | 10249414 | 5/2004 |
| EP | 1455550 A2 | 9/2004 |
| GB | 2371211 A | 7/2002 |
| JP | 03-242795 | 10/1991 |
| JP | 2002-264617 | 9/2002 |
| JP | 2003-148653 | 5/2003 |
| JP | 2003-172827 | 6/2003 |
| JP | 2003-229215 | 8/2003 |
| JP | 2004-039389 | 2/2004 |
| JP | 2004-142500 | 5/2004 |
| JP | 2004-152543 | 5/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-033857 | 2/2005 |
| JP | 2005-050581 | 2/2005 |
| JP | 2005-084162 | 3/2005 |
| JP | 2005-086901 | 3/2005 |
| JP | 2005-087135 | 4/2005 |
| JP | 2005-092107 | 4/2005 |
| JP | 2005-134125 | 5/2005 |
| JP | 2005-216698 | 8/2005 |
| JP | 2005-302403 | 10/2005 |
| JP | 2005-315980 | 11/2005 |
| JP | 2005-339983 | 12/2005 |
| JP | 2006-054118 | 2/2006 |
| JP | 2006-245983 | 9/2006 |
| JP | 2006-279650 | 10/2006 |
| JP | 2007-087849 | 4/2007 |
| JP | 2007-088957 | 4/2007 |
| JP | 2007-158993 | 6/2007 |
| JP | 2007-189774 | 7/2007 |
| JP | 2007-221400 | 8/2007 |
| WO | WO03098175 A1 | 11/2003 |
| WO | WO2004030154 A2 | 4/2004 |
| WO | WO2005069203 A2 | 7/2005 |
| WO | WO2008000656 A1 | 1/2008 |

* cited by examiner

ANTENNA SYSTEMS FOR PASSIVE RFID TAGS

BACKGROUND OF THE INVENTION

1. Field of the Invention

The present invention relates generally to radio-frequency identification (RFID) technology, and in particular relates to antenna systems for passive RFID tags.

2. Technical Background

Radio-frequency identification (RFID) is a remote recognition technique that utilizes RFID tags having information stored therein, usually in an integrated circuit (IC). The stored information is retrievable via RF communication between the RFID tag and a RFID reader. A RFID reader is the device that communicates with one or more RFID tags, which may be placed on or attached to different objects. RFID systems may utilize a hand-held RFID reader that when brought sufficiently close to a RFID tag is able to read a RFID tag signal either emitted by or backscattered from the tag. RFID systems are used for a variety of applications, including inventory management and product tracking in a number of different industries, as well as in libraries and hospitals.

RFID tags generally come in three varieties: passive, semi-passive, and active. Passive RFID tags have no energy or power source of their own and operate by harvesting energy from the RFID reader's RF field. Passive tags communicate with the RFID reader by modulating and back-scattering RF radiation emitted by the RFID reader.

A passive RFID tag essentially comprises an antenna connected to an integrated circuit (IC). The antenna is designed to operate at the RFID reader operating frequency f (wavelength $\lambda$) and serves the dual purpose of capturing power from the reader RF field to power up and operate the IC, and to reflect some of the incident RF field back to the RFID reader in a modulated fashion to communicate information, such as its identification number.

The antenna may have to satisfy a number of design and system constraints on its size and configuration, while still providing a required level of performance to fulfill its function. Antennas currently used for passive RFID tags typically have one or more unsuitable characteristics, such as being too large, the antenna arms extend away from each other, and unacceptable performance sensitivity when several RFID tags are in close proximity with each other, i.e., separated by much less than the RF wavelength $\lambda$ used by the RFID reader.

SUMMARY OF THE INVENTION

An aspect of the invention is an antenna system for a radio-frequency identification (RFID) tag that includes an integrated circuit (IC). The system includes an antenna substrate having a proximal end arranged adjacent the IC, and a distal end. The system also includes a first serpentine antenna element formed on the antenna substrate and having a proximal end electrically connected to the IC. A second antenna element runs in the same direction from the IC as the first serpentine antenna element and has a proximal end connected to the IC. The second antenna element either is a second serpentine antenna element formed on the antenna substrate element or is a conducting wire. A shunt electrically connects the first and second antenna elements and is configured to facilitate impedance matching between the antenna system and the IC. When the second antenna element is a second serpentine antenna element, the system further includes an impedance-matching circuit electrically connected to at least one of the first and second serpentine antenna elements.

Another aspect of the invention is an antenna system for a RFID tag that includes an IC. The system includes an antenna substrate having a proximal and a distal end. The system also includes first and second serpentine antenna elements each supported by the antenna substrate and each having a proximal and a distal end. The system also has first and second feed points arranged at the antenna substrate proximal end and connected to the respective proximal ends of the first and second serpentine antenna elements so as to provide an electrical connection to the IC, which is arranged adjacent the antenna substrate proximal end. The system further includes a conducting wire electrically connected to either of the serpentine antenna elements or to one of the antenna feed points, the conducting wire running in the same direction as the serpentine antenna elements and configured to facilitate impedance-matching and current flow between the antenna system and the IC. The system also has a shunt electrically connected to the first and second serpentine antenna elements or alternatively connected to one of the serpentine antenna elements and the conducting wire. The shunt configured to facilitate impedance matching between the antenna system and the IC.

Another aspect of the invention is an antenna system for a RFID tag that includes an IC. The system includes an antenna substrate having a proximal and a distal end, and a length LM, and first and second serpentine antenna elements supported by the antenna substrate and each having a proximal and a distal end and that run in the same direction. The system also has first and second feed points arranged at the antenna substrate proximal end and electrically connected to the respective proximal ends of the first and second serpentine antenna elements so as to provide an electrical connection to the IC, which is arranged adjacent the antenna substrate proximal end. The system also includes an impedance-matching circuit electrically connected to one of the first and serpentine antenna elements and configured to facilitate impedance-matching and current flow between the antenna system and the IC. The system further includes a shunt electrically connected to the first and second serpentine antenna elements and configured to facilitate impedance matching between the antenna system and the IC.

RFID tags and RFID systems that utilize the RFID antennas of the present invention are also disclosed.

Additional features and advantages of the invention will be set forth in the detailed description that follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF TEE INVENTION

Figure 1:
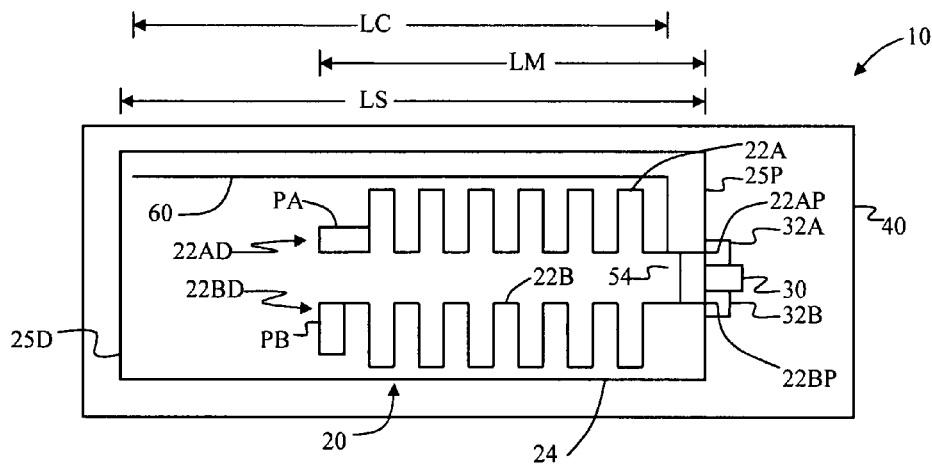
FIG. 1 is a schematic diagram illustrating the basic components of an example embodiment of a RFID tag according to the present invention.

Reference is now made in detail to several exemplary embodiments of the invention, and examples of which are illustrated in the accompanying drawings. Whenever possible, the same reference numerals are used throughout the drawings to refer to the same or like parts.

Generalized RFID Tag and RFID System

FIG. 1 is a schematic diagram illustrating the basic components of an example embodiment of a passive RFID tag 10 according to the present invention. RFID tag 10 includes an antenna system ("antenna") 20 electrically coupled to an integrated circuit (IC) 30 at antenna feed points 32 (two feed points 32A and 32B are shown). Antenna 20 includes at least one serpentine antenna element 22. Two serpentine elements 22A and 22B are shown in FIG. 1 and are referred to in the discussion immediately below for the sake of illustration. In an example embodiment, serpentine elements 22A and 22B each have a length LM. Also shown in FIG. 1 is a conducting wire 60 of length LC introduced and discussed below in connection with example embodiments of antenna system 20.

Each serpentine antenna element 22 has a proximal end 22P (e.g., 22AP and 22BP) and a distal end 22D (e.g., 22AD and 22BD). Each serpentine antenna element 22 is supported by an antenna substrate 24 having a long dimension LS, a proximal end 25P adjacent IC 30, and a distal end 25D. In an example embodiment, antenna substrate 24 is formed from or otherwise includes a dielectric material that is either flexible (e.g., Mylar or paper) or rigid (e.g., ceramic, glass or plastic). In an example embodiment, antenna substrate 24 is rectangular. Antenna 20 and IC 30 are supported by a tag substrate 40.

Figure 2:
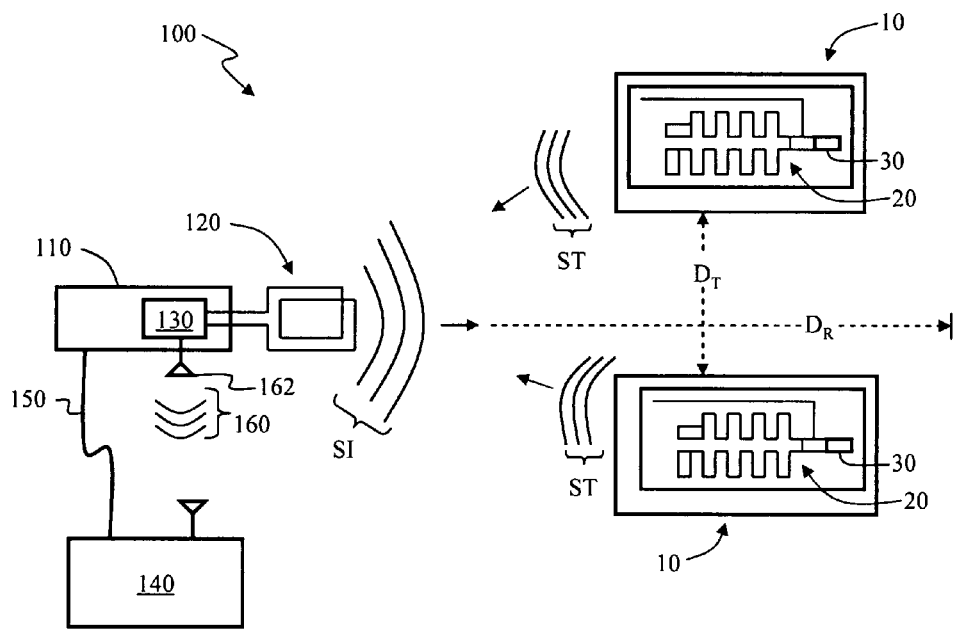
FIG. 2 is a schematic diagram of a generalized RFID system according to the present invention that includes a RFID reader and two passive RFID tags of the type shown in FIG. 1.

FIG. 2 is a schematic diagram of a general RFID system 100 according to the present invention that includes a RFID-tag reader ("RFID reader") 110 and two passive RFID tags 10 of the type shown in FIG. 1. RFID reader 110 includes a reader antenna 120 electrically connected to RF signal processing electronics 130. RFID system 100 also may include a database unit 140 linked to RFID reader 110 via a non-wireless connection 150 (e.g., an optical fiber cable or Ethernet cable) or via a wireless connection (signals) 160 using a wireless antenna 162 electrically connected to RF signal processing electronics 130.

In operation, RFID reader 110 emits a RF interrogation signal SI having a frequency f and a corresponding wavelength $\lambda$. Those RFID tags 10 within the RFID reader's read range $D_R$ are able to capture sufficient power from interrogation signal SI to power IC 30 and to reflect a portion of signal SI back to the RFID reader in a modulated fashion as a tag signal ST. Tag signal ST communicates information stored in the IC, such as a RFID tag identification number or information about an item (not shown) to which the RFID tag might be attached. Tag signal ST is received by RFID reader 110 and is processed by RF signal processing electronics 130 to recover and store the information and/or transmit the information to database unit 140.

Antenna Design Considerations

The present invention is directed to an antenna 20 for a passive RFID tag 10 that includes an IC 30 and that operates at frequencies in the ultra-high frequency (UHF) band or higher. Examples of RFID UHF bands for which the RFID tag of the present invention is best suited include the 866 MHz, 915 MHz, and 2.45 GHz UHF bands.

Antenna 20 of RFID tag 10 of certain embodiments satisfies a number of design requirements. A first requirement is that a main portion of antenna 20 be constituted by at least one serpentine antenna element 22. In an example embodiment, the at least one serpentine antenna element 22 is in the form of at least one metallic conducting line supported by (e.g., formed upon) a dielectric antenna substrate 24. In an example, long dimension LM of the at least one serpentine antenna element 22 is significantly shorter than a half-wavelength of the RF wavelength $\lambda$ used. In an example embodiment, $LM \leq 0.25(\lambda/2)$.

A second requirement is that IC 30 be located at antenna substrate proximal end 25P. This is accomplished by locating antenna feed points 32 at antenna substrate proximal end.

A third design requirement is that multiple long-dimension antenna elements run in the same direction (e.g., are arranged parallel to each other).

A fourth design requirement is that antenna 20 have reduced read-range ($D_R$) sensitivity when the tag separation distance $D_T$ is small (i.e., the sensitivity of the antenna to read range reductions when placed in close proximity (<<1 wavelength separation) to other similar antennas should be minimized).

A fifth design requirement is that antenna 20 is impedance-matched to its load, i.e., to IC 30.

The above requirements for antenna 20 provide for a compact form factor FF (discussed below) that allows for a significantly smaller RFID tag for a given operating frequency than is otherwise possible with prior art RFID tags. Providing antenna feed points 32 of IC 30 at the same end of antenna substrate 24 allows placing IC 30 at one end of the tag for various different purposes, rather than in the middle as in conventional center-fed antenna geometries. The antenna design feature calling for long-dimension antenna components to run parallel to each other in the same direction allows for this functionality. Reduced sensitivity to tag proximity effects is important for applications in which tags are closely spaced and need to retain good performance. The impedance-matching requirement allows for optimizing the amount of RF power provided to IC 30 via antenna 20 so that the IC can be powered even if the RF field from the RFID reader weakens. This serves to increase the read distance $D_R$.

Antenna Example Embodiments

Figure 3:
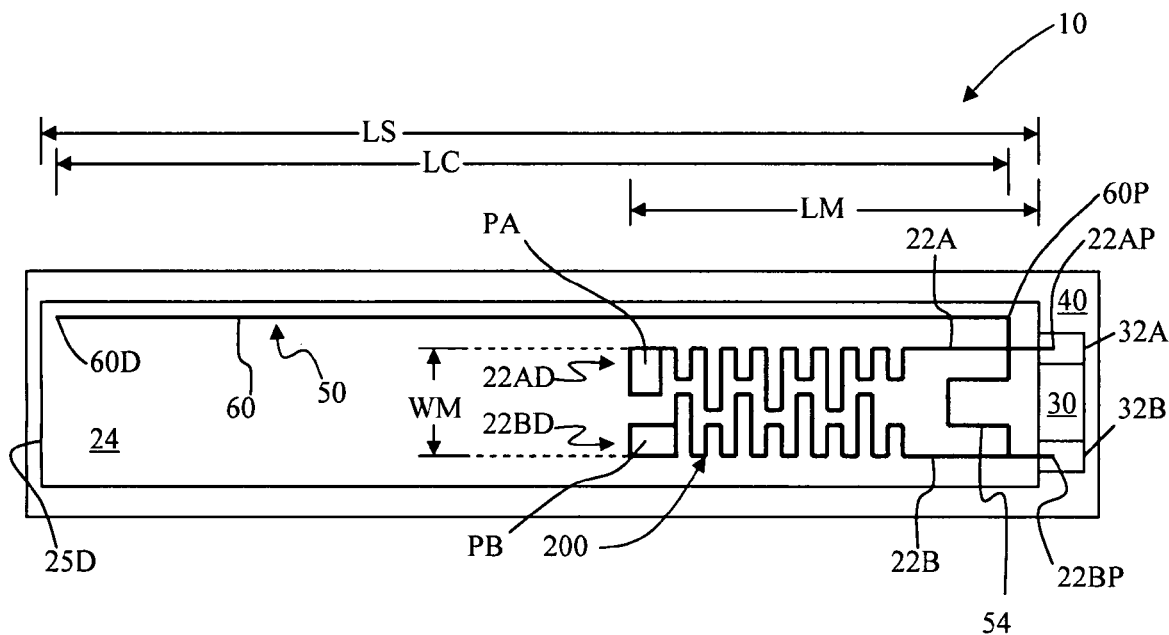
FIG. 3 is a schematic plan view of a first example embodiment of an antenna according to the present invention as used in a passive RFID tag, wherein the antenna includes two serpentine antenna elements and a conducting wire.

FIG. 3 is a schematic plan view of an example embodiment of antenna 20 according to the present invention as used in a passive RFID tag 10 according to the present invention. Generally, antenna 20 includes at least one serpentine antenna element, and the example embodiment of FIG. 3 includes two serpentine antenna elements 22A and 22B. In an example embodiment, serpentine antenna elements 22A and 22B are in the form of antenna traces (e.g., metallic conducting lines) that run in the same direction (and in this sense are "parallel"), namely in the long direction of antenna substrate 24 and away from the corresponding antenna feed points 32A and 32B. In an example embodiment, antenna elements 22A and 22B are formed from a conducting metallic material such as conductive ink, metal, etc., using standard techniques.

Figure 4:
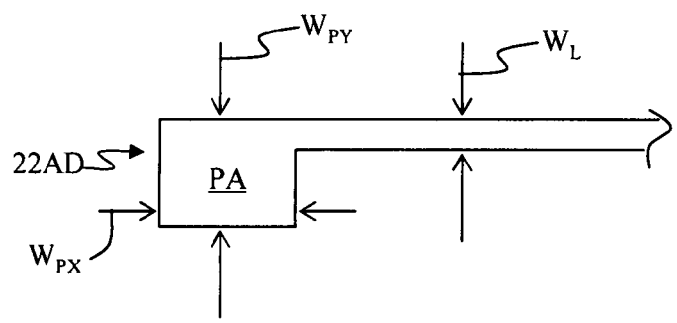
FIG. 4 is a close-up view of the distal end of one of the serpentine antenna elements showing an antenna pad and the dimensions of the antenna pad and the conducting line of the serpentine antenna element.

In an example embodiment, antenna elements 22A and 22B respectively include flat contact areas ("antenna pads") PA and PB at their respective distal ends 22AD and 22BD. FIG. 4 is a close-up view of distal end 22AD of serpentine antenna element 22A illustrating the relative dimensions of antenna pad PA to the corresponding line width of the conducting line of serpentine antenna element 22A. Serpentine antenna element 22A has a line width $W_L$ and antenna pad PA has orthogonal widths $W_{PX}$ and $W_{PY}$. In an example embodiment, antenna pads PA and PB are rectangular and are about twice the size (widths) of, or significantly more than twice the size (widths) of, the associated conducting lines that comprise the rest of the antenna element. Antenna pads PA and PB provide a large metal area that allows for a reduced overall antenna length. Antenna pads PA and PB also serve to increase the antenna power harvesting efficiency and the antenna bandwidth.

Serpentine antenna elements 22A and 22B are electrically contacted at their respective proximal ends 22AP and 22BP to respective antenna feed points 32A and 32B, which are both located adjacent proximal end 25P of antenna substrate 24. The serpentine antenna pattern of antenna elements 22A and 22B enables a more compact antenna than a full half-wave dipole design. Serpentine antenna elements 22A and 22B constitute a main antenna body 200 of length LM and of width WM.

Antenna 20 has an associated form factor FF=LM/$\lambda$, where $\lambda$ is the operating wavelength of antenna 20. In an example embodiment, FF$\leq\lambda$/2. In an example embodiment, LM=40 mm<0.25*($\lambda$/2).

Impedance-Matching Shunt

In a passive RFID tag, IC 30 is powered by RF energy received by antenna 20. To maximize the amount of RF power transferred from antenna 20 to IC 30, the impedance between the antenna and the IC needs to be matched—that is, if the complex impedance of antenna 20 is $Z_{20}$ and the complex impedance of IC 30 is $Z_{30}$, then impedance matching occurs when $Z_{20}=Z^*_{30}$, where "*" represents the complex conjugate.

To facilitate impedance matching, an example embodiment of antenna 20 includes a shunt 54 that electrically connects antenna elements 22A and 22B, and can be arranged, e.g., near antenna element proximal ends 22AP and 22BP. Shunt 54 assists in matching the imaginary part (i.e., the reactance) of the (complex) impedance between antenna 20 and IC 30. The use of shunt 54 in the present invention is to accomplish the desired complex impedance match while maintaining as small an antenna footprint (i.e., form factor) as possible. The relevant shunt parameters as will be understood by those skilled in the art include the location where the shunt attaches to serpentine antenna elements 22A and 22B, and the distance from antenna feed points 32A and 32B, which parameter serve to define the area under the shunt loop and hence the inductance of the antenna.

The shunt attachment point to serpentine antenna elements 22A and 22B can be adjusted to increase or decrease the imaginary part of the impedance (i.e., the inductance) of antenna 20. Shunt 54 also acts as a DC short-circuit resistance that helps to eliminate high voltage discharge (ESD) from damaging IC 30. The shunt inductance and the IC capacitance form a resonant circuit useful for near-field UHF RFID applications.

Conducting Wire

In an example embodiment, antenna 20 also includes conducting wire 60 of length LC. In an example embodiment, conducting wire 60 is attached to one of the serpentine antenna elements (e.g., to antenna element 22A, as shown) near the corresponding antenna feed point (e.g., feed point 32A, as shown). Conducting wire 60 is sized to facilitate impedance matching between antenna 20 and IC 30 and to improve (e.g., to the point of optimizing) antenna current flow to and from the IC. Conducting wire 60 also serves to reduce the overall size of antenna 20.

The length of conducting wire 60 is chosen to best match the impedance of antenna 20 to IC 30 while increasing the power harvesting efficiency over the given frequency band, which in example embodiment is 900 MHz to 930 MHz. In an example embodiment, this is carried out via computer simulations using antenna simulation software to determine the optimal conducting wire length for a given frequency and input impedance. The length scales with frequency (relative to wavelength) assuming a fixed input impedance.

As discussed above, good impedance matching between antenna 20 and IC 30 ensures good RF power capture of RF power from the RF interrogation signal (field) SI and therefore a relatively large read range $D_R$. Conducting wire 60 can also be considered an "antenna element" but is referred to herein as a "conducting wire" to differentiate between the at least one serpentine antenna element.

Figure 5:
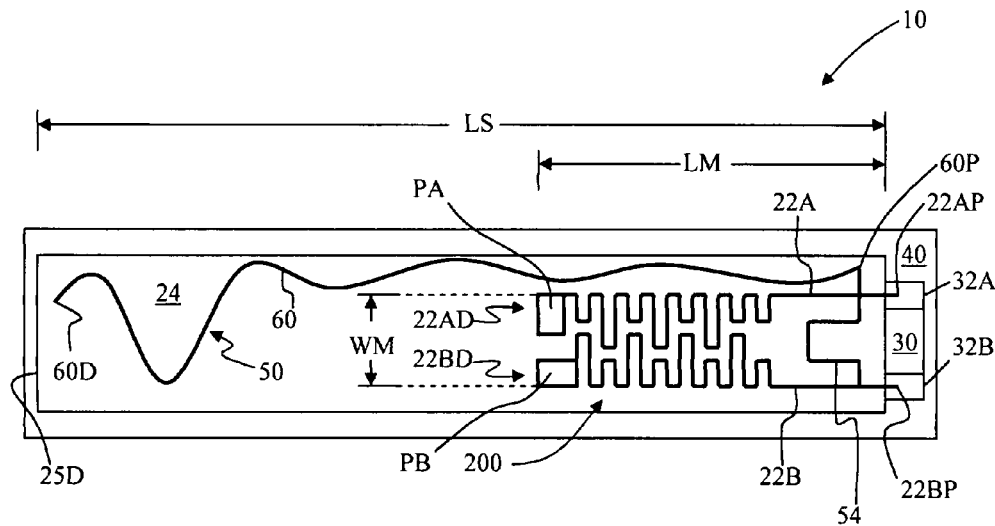
FIG. 5 is a schematic plan view of the RFID tag and antenna of FIG. 3, but wherein the conducting wire has a number of bends.

In an example embodiment, conducting wire 60 is straight. However, conducting wire 60 need not be straight and in an example embodiment can be bent or curved significantly and still function effectively. Simulations and testing of antenna 20 having a conducting wire 60 with bends as much as 90 degrees in any direction showed only small performance effects. Even larger deviations from straightness of conducting wire 60 are possible as long as the antenna element does not wrap back against itself and/or otherwise couple to itself. Tests with conducting wire 60 in close proximity and/or being twisted together with another conducting wire of another nearby antenna had very little effect on performance. FIG. 5 illustrates an example embodiment similar to that shown in FIG. 3, but wherein conducting wire 60 includes a number of bends. Such bends allow for antenna 20 to be even more compact.

In an example embodiment used in conjunction with a connectorized optical fiber cable, antenna 20 is considerably shorter than a ½-wave dipole antenna while harvesting as much power as a theoretical dipole antenna. If conducting wire 60 is serpentine as well, the antenna length is even shorter. The only length of significance with respect to antenna performance is the length of serpentine antenna elements 22A and 22B because these two elements are integrated with the connector, while conducting wire 60 is not so integrated and can be integrated, e.g., with a fiber cable (not shown), in certain embodiments of the present invention.

Figure 6:
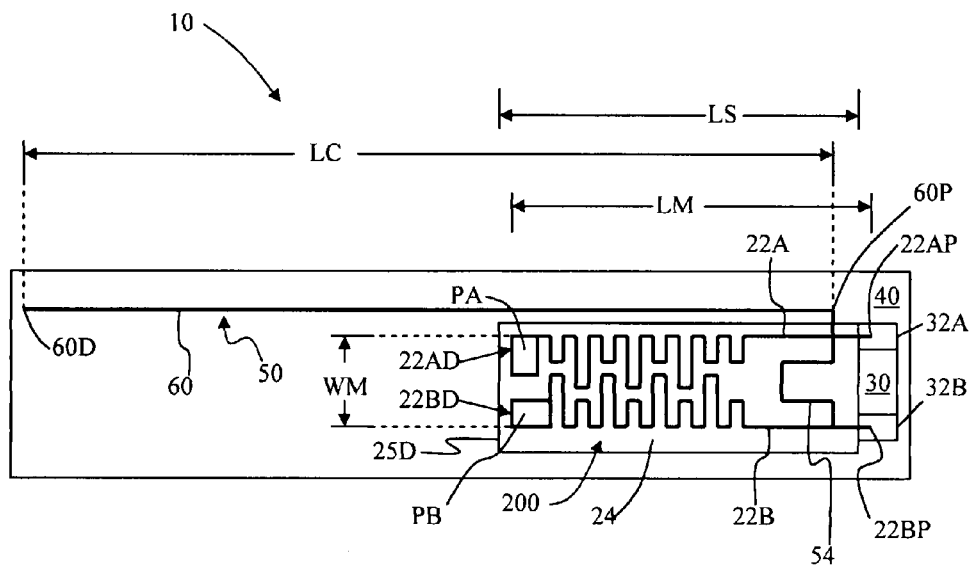
FIG. 6 is a schematic plan view similar to that of FIG. 3, but illustrating an example embodiment wherein conducting wire is not supported by the antenna substrate.

In an example embodiment, conducting wire 60 need not be formed as a conductive trace and supported by antenna substrate 24 as shown in FIG. 3, but can be a conventional unsupported wire. In an example embodiment, conducting wire 60 extends beyond antenna substrate distal end 25D as shown in FIG. 6. Note that in the example embodiment of RFID tag 10 of FIG. 6, if needed tag substrate 40 can be used to support conducting wire 60 in the absence of support from antenna substrate 24. Still further embodiments of the present invention include conducting wires that comprise a conducting path formed on a substrate or any other type of conducting lead.

Simulations and experiments carried out by the inventors have shown that the overall performance of RFID tag 10 when used in RFID system 100 is not particularly sensitive to the exact position or angle of conducting wire 60 relative to main antenna body 200.

Figure 7:
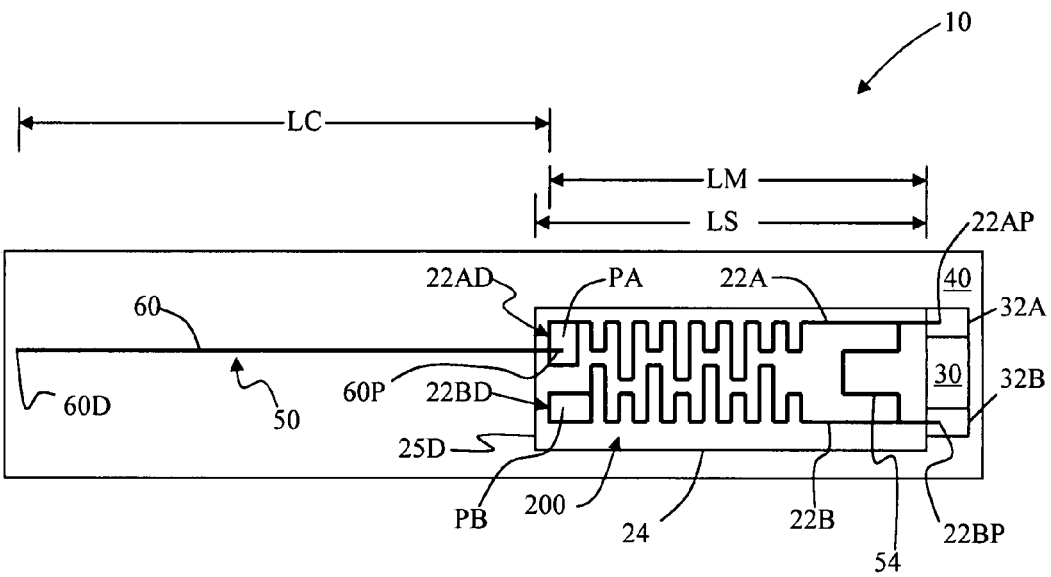
FIG. 7 is a schematic diagram similar to that of FIG. 6, illustrating an example embodiment wherein the conducting wire is electrically connected to the distal end of one of the serpentine antenna elements.

The example embodiments of antenna 20 of FIG. 3, FIG. 5 and FIG. 6 show conducting wire 60 attached to one of the serpentine antenna elements 22 at a single point near IC 30. This placement, however, is not critical, as illustrated in the example embodiments below. FIG. 7 is a schematic diagram similar to that of FIG. 6, illustrating an example embodiment wherein conducting wire 60 is electrically connected to distal end 22AD of serpentine antenna element 22A.

Figure 8:
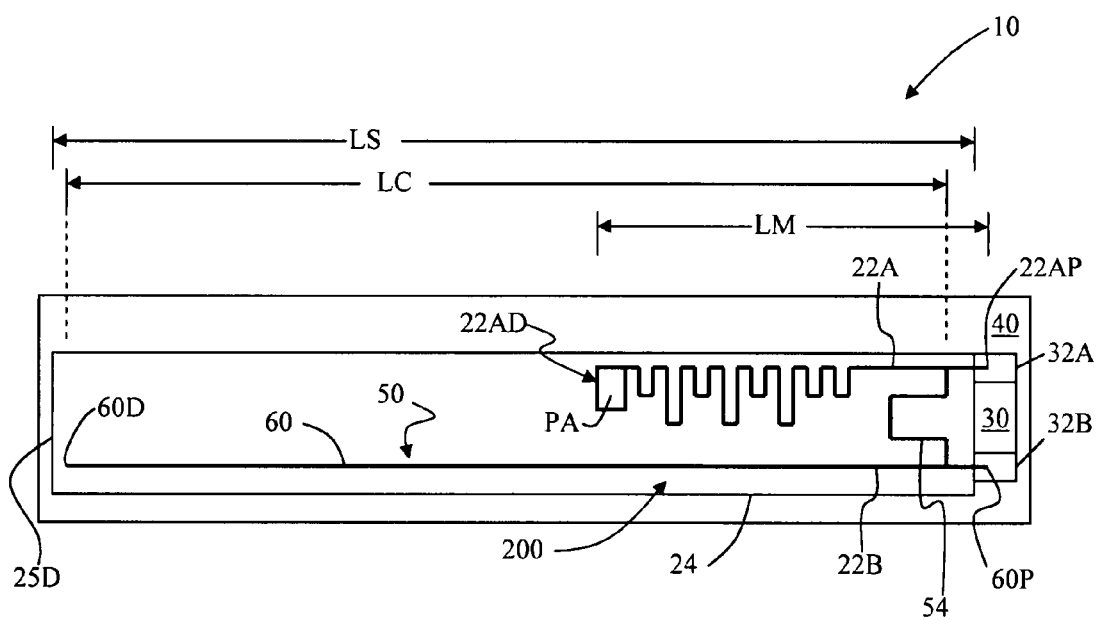
FIG. 8 is a schematic diagram similar to FIG. 3, illustrating an example embodiment wherein one of the serpentine antenna elements is replaced by the conducting wire.

FIG. 8 is a schematic diagram similar to FIG. 3, illustrating an example embodiment of antenna 20 wherein one of the serpentine antenna elements 22B is replaced by conducting wire 60. Simulations carried out by the inventors indicate that the example embodiments of antenna 20 of FIG. 7 and FIG. 8 work as well or better than the example embodiment of FIG. 3, at least in terms of impedance matching to a given IC impedance.

Example Antenna Design Parameters

In an example embodiment, antenna 20 of FIG. 3 is designed to operate in the 915 MHz band, and has dimensions of LM=40 mm, WM=9 mm and LC=105 mm. The form factor FF=40 mm/328 mm=0.12. In this case, the overall length of antenna 20 is approximately equal to LC, which is about (⅓)λ, while LM is about (⅛)λ.

Shunt 54 is placed and shaped in such a way that antenna 20 has a reactive part of the impedance of about 100 ohms, to match the capacitive reactance of a typical IC 30. Experiments by the inventors using this specific example antenna configuration combined with two different commercially available ICs (EPC global Class 1, Gen2 RFID IC from Texas Instruments, Inc., and from Impinj, Inc.) demonstrated RFID tag readability for read distances $D_R$ up to approximately 40 feet. It should be noted that if an IC 30 is used with a different input impedance, then the optimal length LC of straight conducting wire 60 is likely to differ from 105 mm, and the precise placement of shunt 54 is also likely to change.

Antenna with Impedance-Matching Circuit

As discussed above, conducting wire 60 and shunt 54 help control the antenna input impedance and thus contribute to optimizing RF current flow between the antenna and the IC. In another example embodiment of antenna 20, rather than using conducting wire 60 attached to one of the serpentine antenna elements, an impedance-matching circuit 70 made up of discrete electronic components (e.g., capacitors and inductors) is used. In an example embodiment, impedance-matching circuit 70 includes the standard configuration of a series inductor and a shunt capacitor that is generally used for impedance matching in antennas. However, this is not a required configuration. In an example embodiment, known arrangements of discrete capacitors and/or inductors in impedance-matching circuit 70 are used in the present invention to tailor the reactance to obtain a better impedance match.

Figure 9:
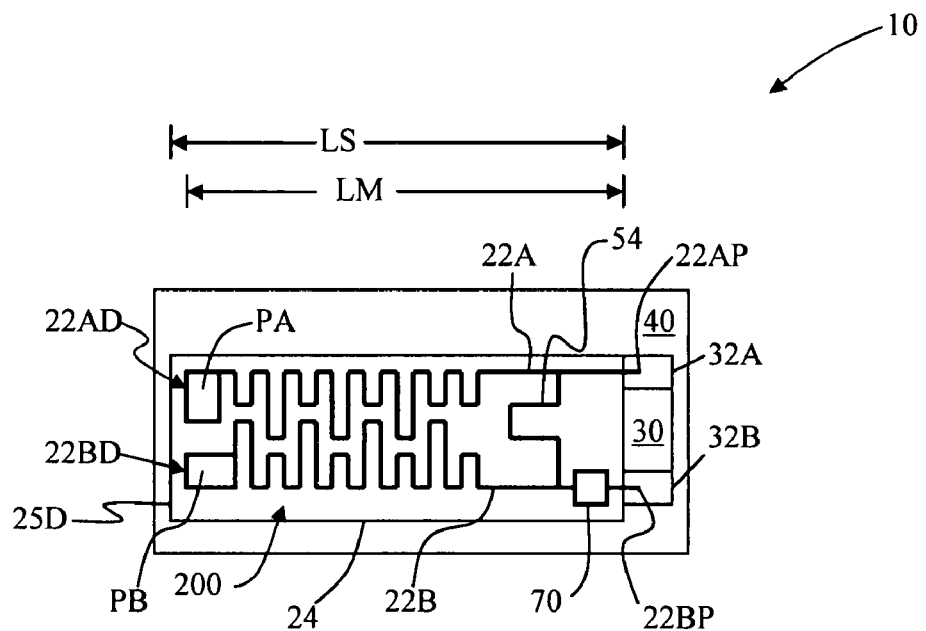
FIG. 9 is a schematic diagram similar to FIG. 3 illustrating an embodiment wherein the antenna does not include a conductive wire and that uses an impedance-matching circuit to achieve impedance matching.

FIG. 9 is a schematic diagram similar to FIG. 3 illustrating an embodiment of RFD) tag 10 that includes an impedance-matching circuit 70 operably arranged between IC 30 and antenna 20. The discrete electronic components making up circuit 70 may be placed anywhere on antenna 20 that maximizes antenna performance.

Figure 10:
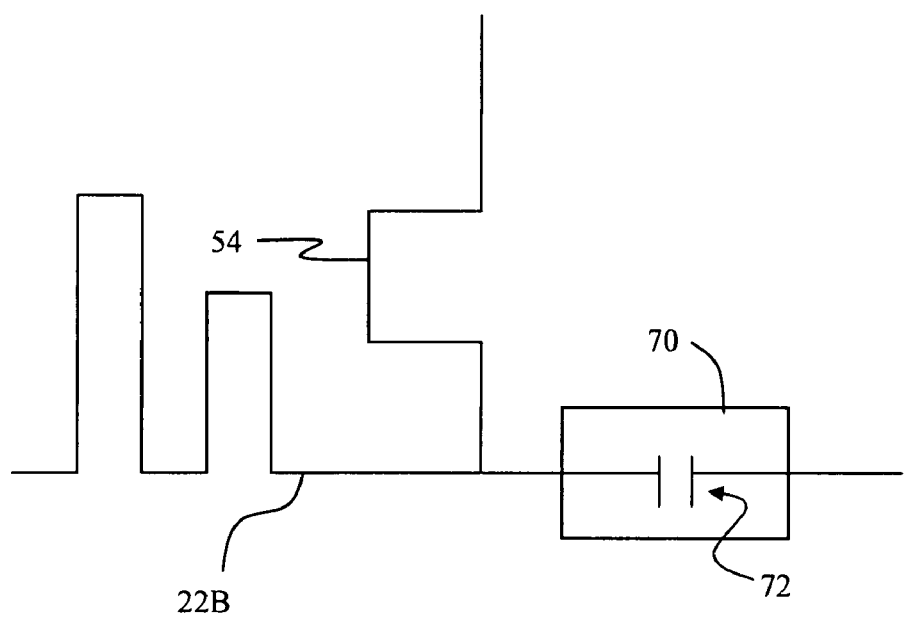
FIG. 10 is a close-up diagram of the impedance-matching circuit of FIG. 9, illustrating an example embodiment wherein the impedance-matching circuit has a single capacitor.

By way of example, FIG. 10 is a close-up diagram illustrating an example embodiment impedance-matching circuit 70 that includes a single capacitor 72 placed in series between IC 30 and shunt 54. Simulation results indicate that capacitor 72 having a capacitance of a few pF improves the impedance matching of the antenna embodiment illustrated in FIG. 9.

Reduced Tag Proximity Effects

As mentioned above, one feature of antenna 20 is that it helps prevent RFID system performance degradation when two or more RFID tags 10 are in close proximity and within the read range $D_R$ of RFID reader 110. In general, two antennas in close proximity (e.g., much closer than λ) can suffer mutual impedance effects that can degrade their performance. In this case, the impedance of antenna 20 in each RFID tag 10 changes, causing a mismatch between it and the load—i.e., IC 30. The inventors have found that the expected degradation due to this proximity effect for antenna 20 of the present invention appears to be less than that for theoretical dipoles or some commercially available RFID tags. Investigations by the inventors indicate that while the read range $D_R$ may be reduced by 12% to 25% for RFID tags of the present invention separated by 15 mm, this is significantly less than the corresponding reduction in read range of about 50% for theoretical dipoles and commercially available RFID tags having center-fed antennas.

Figure 11:
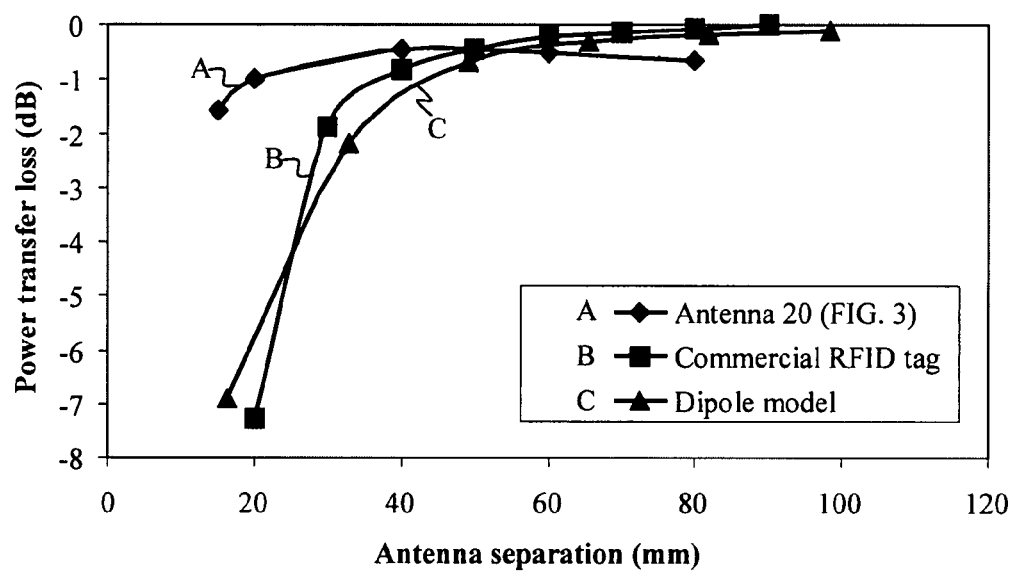
FIG. 11 is a plot of power transfer loss (dB) vs. antenna separation (mm) for simulated power transfer loss due to an impedance mismatch from the antenna to the IC for two identical RFID tags in close proximity, for three different antenna design structures.

FIG. 11 is a plot of power transfer loss (dB) vs. antenna separation (mm) for a simulated power transfer loss due to an impedance mismatch from antenna 20 to IC 30 for two identical and proximally arranged RFID tags. The plot of FIG. 11 includes three curves: curve A is for antenna 20 of FIG. 3, curve B is for a conventional RFID tag antenna, and curve C is for a dipole antenna. The power transfer loss is significantly smaller for antenna 20 at small RFID-tag spacings than for the other antennas.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An antenna system for a radio-frequency identification (RFID) tag, comprising:

an antenna substrate;

an integrated circuit (IC) disposed on an end of the antenna substrate or adjacent to the end of the antenna substrate;

at least one serpentine antenna element having a first length and formed on the antenna substrate and electrically connected to the IC and extending from the IC in a first direction;

a conducting wire having a second length different from the first length electrically connected to either the IC or the at least one serpentine antenna element and extending on the antenna substrate in the first direction or substantially in the first direction; and a shunt electrically connected to the at least one serpentine antenna element and to the conducting wire, the shunt configured to facilitate impedance matching between the antenna system and the IC.

2. The antenna system of claim 1, wherein the at least one serpentine antenna element comprises a first serpentine antenna element and a second serpentine antenna element.

3. A RFID tag, comprising:
the antenna system of claim 1; and
an integrated circuit (IC) electrically connected to the antenna system.

4. A RFID system, comprising:
at least one RFID tag according to claim 3; and
a RFID reader configured to RF-communicate with the at least one RFID tag.

5. A method performing RFID, comprising
providing the RFID system of claim 4; and
sending a RF interrogation signal from the RFID reader to at least one RFID tag to power the at least one RFID tag and to receive a RFID-tag signal therefrom.

6. The antenna system of claim 1, wherein the at least one serpentine antenna element is either a wire or a conductive pattern in the antenna substrate.

7. The antenna system of claim 1, wherein the conducting wire is either a wire or a conductive pattern in the antenna substrate.

8. The antenna system of claim 1, wherein the conducting wire is electrically connected to a distal end of the at least one serpentine antenna element.

9. The antenna system of claim 1, wherein the shunt is either a straight conductor or a serpentine conductor.

10. The antenna system of claim 1, wherein the shunt is electrically connected between the at least one serpentine antenna element and the conducting wire on the proximal end of the antenna substrate.

11. The antenna system of claim 1, wherein the shunt is electrically connected between the at least one serpentine antenna element and the conducting wire on a distal end of the antenna substrate.

12. The antenna system of claim 1, wherein the shunt is electrically connected to the at least one serpentine antenna element and to the conducting wire on a proximal end of the antenna substrate.

13. The antenna system of claim 1, wherein the conducting wire runs in the same direction as the at least one serpentine antenna element.

14. The antenna system of claim 1, wherein the conducting wire is straight.

15. The antenna system of claim 1, wherein the conducting wire is not straight.

16. An antenna system for a radio-frequency identification (RFID) tag that includes an integrated circuit (IC), comprising:
an antenna substrate having a proximal end and a distal end;
a first serpentine antenna element and a second serpentine antenna element, the first and second serpentine antenna elements each supported by the antenna substrate and each having a proximal end and a distal end;

first and second antenna feed points arranged at the antenna substrate proximal end and connected to the respective proximal ends of the first and second serpentine antenna elements so as to provide an electrical connection to the IC, which is arranged adjacent the antenna substrate proximal end;

a conducting wire electrically connected to either the first or second serpentine antenna element or the first or second antenna feed point, such that the antenna length of either the first or second serpentine antenna element is longer than the antenna length of the second or first serpentine antenna element, respectively; and a shunt electrically connected to the first and second serpentine antenna elements or one of the first and second serpentine antenna elements and the conducting wire, the shunt configured to facilitate impedance matching between the antenna system and the IC.

17. The antenna system of claim 16, further including first and second antenna pads at the respective distal ends of the first and second serpentine antenna elements.

18. The antenna system of claim 16, wherein the conducting wire is straight.

19. The antenna system of claim 16, wherein the first and second serpentine antenna elements and the conducting wire are formed of a metal conducting line formed on the antenna substrate.

20. The antenna system of claim 16, wherein the antenna substrate has a length LM, the antenna system has an operating wavelength of $\lambda$ a form factor $FF=LM<\lambda/2$.

21. A RFID tag, comprising:
the antenna system of claim 16; and
the integrated circuit (IC) electrically connected to the antenna system via said first and second antenna feed points.

22. A RFID system, comprising:
at least one RFID tag according to claim 21; and
a RFID reader configured to RF-communicate with the at least one RFID tag.

23. The antenna system of claim 16, wherein the shunt is electrically connected between the first and second antenna feed points.

24. An antenna system for a radio-frequency identification (RFID) tag that includes an integrated circuit (IC), comprising:
an antenna substrate having a proximal end and a distal end;
a first serpentine antenna element and a second serpentine antenna element, the first and second serpentine antenna elements each supported by the antenna substrate and each having a proximal end and a distal end;
first and second antenna feed points arranged at the antenna substrate proximal end and electrically connected to the respective proximal ends of the first and second serpentine antenna elements so as to provide an electrical connection to the IC, which is arranged adjacent the antenna substrate proximal end;
a conducting wire electrically connected to either the first or second serpentine antenna element or the first or second antenna feed point, such that the antenna length of either the first or second serpentine antenna element is longer than the antenna length of the second or first serpentine antenna element, respectively;
an impedance-matching circuit electrically connected to one of the first and second serpentine antenna elements and configured to facilitate impedance-matching and current flow between the antenna system and the IC; and a shunt electrically connected to the first and second serpentine antenna elements and configured to facilitate impedance matching between the antenna system and the IC.

25. The antenna system of claim 24, wherein each of the first and second serpentine antenna elements further includes at its distal end a flat antenna pad.

26. The antenna system of claim 24, wherein the antenna system has an operating wavelength of $\lambda$, the first and second serpentine antenna elements each have a length LM, and wherein the antenna system has a form factor $FF=LM<\lambda/2$.

27. A RFID tag, comprising:
the antenna system of claim 24; and
the integrated circuit (IC) electrically connected to the antenna system via said first and second antenna feed points.

28. A RFID system, comprising:
at least one RFID tag according to claim 27; and
a RFID reader configured to RF-communicate with the at least one RFID tag.

* * * * *